United States Patent [19]

Reese et al.

[11] 3,723,572
[45] Mar. 27, 1973

[54] SYNTHETIC RESINS

[75] Inventors: Johannes Reese; Hermann Hotze, both of Wiesbaden-Biebrich, Germany

[73] Assignee: Chemische Werke Albert, Wiesbaden-Biebrich, Germany

[22] Filed: Mar. 13, 1970

[21] Appl. No.: 19,464

[52] U.S. Cl.............260/860, 117/93.4 R, 260/843
[51] Int. Cl.............................B05b 5/00, C08g 39/10
[58] Field of Search...........260/860, 843; 117/93.4 R

[56] References Cited

UNITED STATES PATENTS

| 3,108,083 | 10/1963 | Laganis | 260/843 |
| 3,382,295 | 5/1968 | Taylor et al. | 260/860 |
| 3,484,339 | 12/1969 | Caldwell | 260/860 |
| 3,546,320 | 12/1970 | Duling | 260/860 |
| 3,296,335 | 1/1967 | Blaschke | 260/860 |
| 3,205,192 | 9/1965 | Denson | 260/40 |
| 3,277,040 | 4/1966 | Barkis | 260/29.6 |

FOREIGN PATENTS OR APPLICATIONS

| 203,115 | 10/1958 | Austria |
| 55,820 | 5/1967 | Germany |
| 1,164,588 | 3/1964 | Germany |

OTHER PUBLICATIONS

Tappi, Vol. 38, No. 10, Oct. 1955, pp. 607–609, Reif, "An Electrostatic Process for Applying Dry Coatings on Paper."
Patent Trade Mark and Copyright, No. 61, 1-20-72, A-2.

*Primary Examiner*—William H. Short
*Assistant Examiner*—Edward Woodberry
*Attorney*—Hammond and Littell

[57] ABSTRACT

A thermosetting resinous composition which comprises a pulverulent mixture of (A) a synthetic resin component containing free hydroxyl groups and (B) a synthetic resin component containing free carboxyl groups, both of said components having a melting point of at least 50°C, a process for powder coating and for forming a moulded article by using said composition.

9 Claims, No Drawings

SYNTHETIC RESINS

This invention concerns improvements in synthetic resins and more particularly relates to a thermosetting pulverulent synthetic resin composition for powder coating or the manufacture of moulded articles.

Special requirements as regards their physical characteristics must be met by resins suitable for powder coating. They must e.g. have such a high melting point that after grinding they form a free-flowing powder. The powder must not agglomerate or form lumps and must therefore remain stable under normal conditions. When the powder is applied by the whirl sintering process it sinters on meeting the surface of the preheated workpiece. Both after this coating process or after spray application of the electrostatically charged powder it is fused and cured by heating. The flow properties of the fused powder must be good enough to ensure that, even in the presence of pigments, a faultless surface is produced. For powder coating purposes e.g. epoxy resin-hardener mixtures or mixtures of polyester resins with dianhydrides e.g. pyromellitic anhydride have been proposed.

Now according to the present invention there is produced a thermosetting resinous composition which comprises a pulverulent mixture of (A) a synthetic resin component containing free hydroxyl groups and (B) a synthetic resin component containing free carboxyl groups, both of said components having a melting point of at least 50°C.

The term "synthetic resin" is used herein to include semi-synthetic and modified natural resins.

Both components are themselves solid resins which even after mixing at room temperature do not liquefy or cake. The melting point is generally above 50°C, preferably above 65°C and is advantageously not above 150°C. Both components yield free-flowing powders after grinding which even after mixing have good stability.

After the addition of pigments, the mixture of A and B can be applied, e.g. either by whirl sintering or by electrostatic spraying and the coated material may then be stoved at e.g. 150° to 300°C, preferably 180° to 250°C. Extremely tough coatings are thus formed, with a good surface and high elasticity. It is also possible to apply a plurality of such coatings to obtain certain desired effects.

Compounds (A) and (B) can be of varying chemical structure. The powder composition may e.g. be a mixture of two polyesters (A) and (B) of different constitution or two copolymers (A) and (B) of different constitution or a mixture of a polyester containing free hydroxyl or carboxyl groups and a copolymer containing free carboxyl or hydroxyl groups.

Suitable polyesters include polyesters of terephthalic acid, isophthalic acid, phthalic acid, adipic acid, naphthalic-1,8-dicarboxylic acid, fumaric acid, maleic acid, itaconic acid, tetrahydrophthalic acid, tetrachlorophthalic acid, hexachloro-endomethylene-tetrahydrophthalic acid or mixtures of two or more thereof.

When component A is a polyester it may include as hydroxylic component residues of e.g. trihydric or higher functional alcohols with three to 12 carbon atoms, such as glycerol, trimethylol-ethane or -propane, hexane triols, pentaerythritol, dipentaerythritol or mixtures of two or more thereof. Mixtures of such alcohols with up to 35 molar percent of diols such as ethylene glycol, propane diols, glycol ethers such as di- and triethylene or propylene glycol or hydrogenated diphenylol propane are also suitable.

In selecting suitable components A and B it must be ensured that a melting point of at least 50°C is obtained for each component. This can e.g. be ensured by the presence in adequate amounts of residues of acids of a preponderantly aromatic character and/or trihydric or higher functional alcohols.

The hydroxylic component A is advantageously prepared by transesterification of a poly (ethylene terephthalate) of random molecular weight e.g. in the range usual for fiber and film manufacture, or a monomeric terephthalate ester of one or more monohydric alcohols having e.g. one to four carbon atoms, with the above-indicated trihydric or higher functional alcohols or their mixtures e.g. by heating to 180°–270°C. Suitable polyhydric alcohols for the preparation of component A also include ethers of even higher functional alcohols, such as alkyl ethers of pentaerythritol, the alkyl groups having 1–6 carbon atoms e.g. methyl, provided that these ethers have at least three free alcoholic hydroxyl groups, or alkyl esters, such as the isononyl ester of pentaerythritol.

Component (A) has advantageously a hydroxyl number of 150 to 450. Provided that an adequate hydroxyl number e.g. 150 is also obtainable with dihydric alcohols, e.g. by extensive cleavage of the polyester, such alcohols can also be used along or in combination with trihydric or higher functional alcohols. The dihydric alcohols mentioned hereinbefore and hereinafter can be used.

The high molecular weight by-products obtained from the manufacture of fibers or film can also be used for preparing component (B). When component (B) is a polyester it may e.g. include as hydroxylic component residues of dihydric alcohols with two to 24, preferably two to 18 carbon atoms, such as ethylene glycol, propane diols, butane diols, dimethylol cyclohexane, neopentyl glycol (2,2-dimethyl propane-1,3-diol), diethylene glycol, triethylene glycol, dihydroxy dibutylether, hydrogenated bisphenol, ethoxylated or propoxylated bisphenol or similarly modified bisphenol, partially esterified or etherified trihydric or higher functional alcohols containing in addition to the ether groups two free hydroxyl groups, such as the dimethyl ether of pentaerythritol or alkyl ethers wherein the alkyl groups have up to six carbon atoms or esters with ester groups having up to 10 carbon atoms of the above-indicated polyhydric alcohols or the like. The diols can also be used in admixture with higher functional alcohols e.g. those mentioned above.

The carboxylic acid component of polyester (B) may be derived from polycarboxylic acids with two to 24 carbon atoms or their functional derivatives such as anhydrides, esters or halides, e.g. phthalic acid, isophthalic acid, trimellitic acid, trimesic acid, pyromellitic acid, cyclopentane-dicarboxylic acid, cyclopentane-tetracarboxylic acid, cyclohexane-dicarboxylic acid, benzophenone-tetracarboxylic acid, bycyclooctene-tricarboxylic anhydride, maleic acid, fumaric acid or Diels-Alder adducts of maleic anhydride or other α,β-unsaturated dicarboxylic acids. Also suitable is e.g. the Diels-Alder adduct of maleic anhydride with colophony (24 carbon atoms). These polycarboxylic acids may be used to react with the free hydroxyl groups of the alcohols to obtain the polyester (B). The quantity of the acid or derivative thereof employed is appropriately such that 80 percent and preferably practically all free hydroxyl groups are reacted. It is also possible to use aliphatic saturated or unsaturated short-chained e.g. up to six carbon atoms, aliphatic polycarboxylic acids or their functional derivatives together with the acid components mentioned hereinbefore, in a proportion not exceeding 20 percent by weight of total acid components. Suitable aliphatic acids are e.g. succinic acid, adipic acid, maleic acid, fumaric acid or the like. Appropriately the acid number is 150 to 350. By using longer-chained dihydric alcohols, e.g. those with 8 to 24 or 12 to 24 carbon atoms are dihydric alcohols with two to 18 carbon atoms containing ether groups, such as di-, tri-, tetra-or pentaethyleneglycol, the elasticity of the composition can be regulated. Optionally transesterification can be accelerated by the addition of catalysts e.g. zinc chloride or cobalt salts e.g. cobaltous salts of half-esters of divalent acids.

When component B is a copolymer it may e.g. be a copolymer of mono- or dibasic olefinically unsaturated acids, such as acrylic acid, methacrylic acid, maleic acid, crotonic acid, with other copolymerizable monomers e.g. styrene, ethylene, acrylates or methacrylates, acrylo- or methacrylonitrile, acryl- or methacrylamide or allyl compounds. Such copolymers containing carboxyl groups are only used for component (B) while for component (A) preferably hydroxyalkyl esters of acrylic acid, methacrylic acid, crotonic acid, maleic acid, copolymerized e.g. with ethylene, styrene, acrylonitrile or the like are used.

The mixture of compounds (A) and (B) can also be processed to moulded articles e.g. under pressure and heat in the presence of conventional additives e.g. lubricants, accelerators, organic and inorganic fillers e.g. sawdust, cellulose dust, textile cuttings, asbestos dust, ground limestone, dolomite, finely divided silicic acid, in particular quartz powder, glass powder, glass fibers calcium-aluminum silicates or mica. In addition, pigments e.g. titanium dioxide, zinc oxide, carbon black, red or black iron oxide, cadmium yellow or chromic oxide can be added.

The pigments, fillers or other additives can be added to components (A) and/or (B) during or after their preparation. Mixing preferably takes place by grinding or melting in a kneader. Components (A) and (B) can also be mixed with various fillers.

One advantage of using two components is that each can be adjusted so as to have a very low viscosity. Thus, the viscosity of component (A) can be e.g. 400–1,200 cp and that of component (B) e.g. 250–1,000cp ( in each case measured at 20°C in a 50 % ethylene-glycol monobutylether solution). In certain cases the viscosity can be above or below the indicated ranges. For example, a polyester containing adequate amounts of hydroxyl groups and carboxyl groups in the same molecule can be considerably more viscous but after application gives coatings with inferior surface characteristics. The low viscosity is, however, essential for the production of coatings with a smooth surface.

A suitable mixing ratio (by weight) of components (A) and (B) is in the range 90:10 to 10:90, preferably 70:30 to 30:70. In practice, such quantities of (A) and (B) should be used that the ratio of free carboxyl groups to free hydroxyl groups is between 0.75:1 and 1:0.8, preferably between 0.9:1 and 1:0.9. Preferably the hydroxyl number of (A) is somewhat higher than the acid number of (B).

The particle size of the powder may in general be between 30 and 200μ; for spray application particles in the range 30 to 100μ are preferred and for whirl sintering, particles in the range up to 200μ.

The powder mixtures according to the invention may be used to form coatings having a thickness of e.g. 35 to 400, preferably 50 to 200μ; these thicknesses ensure satisfactory edge protection. When using the electrostatic spray process coating thicknesses of e.g. 35 to 100μ may be used and when using the whirl sintering process the thickness may be e.g. at least 100μ. These coatings applied e.g. electrostatically or by the whirl sintering process and thermoset are in no way inferior to varnish coatings produced conventionally from solutions. In particular, good corrosion protection is obtained.

In order that the invention may be better understood the following Examples are given by way of illustration only. Examples A and B illustrate the preparation of resins suitable as components A and B, while the remaining Examples illustrate the preparation and use of compositions according to the invention.

EXAMPLE A

A1. 3000g of poly(ethylene terephthalate) and 2,010g of trimethylol propane are heated to 250°C, while introducing an inert protective gas. The ethylene glycol liberated during transesterification is collected in a receiver. After about 3½ hours the amount of distillate is 350g. Subsequently the reaction mixture is cooled to 160°C and water pump vacuum applied. The temperature is again raised to 230°C and held there until 500g of distillate have distilled off. Then the resin is drawn off.

The OH number of the resin is 260 and the melting range 70°–77°C.

A2. 3000g of poly(ethylene terephthalate) and 1380g of glycerol are heated to 250°C. After 3½ hours water pump vacuum is applied and the temperature lowered to 230°C. After a further hour in vacuo the resin is drawn off. The resin has the following characteristics: hydroxyl number 300, melting range 68°–73°C.

A3. 1200g of trimethylolethane and 200g of poly(ethylene terephthalate) are heated to 250°C. After 4 hours 250g of distillate have distilled over. Subsequently water pump vacuum is applied and the temperature lowered to 230°C. After 30 minutes the resin is drawn off. Characteristics of the product: OH number 280, melting range 66°–74°C.

A4. 240g of hydrogenated diphenylolpropane are esterified with 296g of phthalic anhydride to an acid number of 40. Subsequently 268g of trimethylolpropane are added, followed by further esterification to an acid number of 20. After cooling, the resin has a melting point of 75°C and a hydroxyl number of 270.

A5. 240g of hydrogenated diphenylolpropane are esterified with 296g of phthalic anhydride to an acid number of 40. Subsequently 272g of pentaerythritol are added and esterification to an acid number of 40 takes place. After cooling, the resin has a melting point of 80°C and a hydroxyl number of 300.

A6. 360g of trimethylol propane are esterified with 444g of phthalic anhydride to an acid number of 60. The resin thus obtained has a hydroxyl number of 250 and a melting point of 60°C.

A7. 344g of propoxylated diphenylolpropane are heated for 20 minutes to 150°C with 196g of maleic anhydride. Subsequently the reaction mixture is mixed with 272g of pentaerythritol, followed by esterification at 190°C to an acid number of 20. A resin with a hydroxyl number of 300 is obtained.

EXAMPLE B

B1. In the same apparatus as used for the preparation of component A, 2,000g of poly(ethylene terephthalate) and 1060g diethylene glycol are heated to 250°C in the presence of 5g of cobalt butyl phthalate. When 350g of distillate have distilled over, the reaction mixture is allowed to cool to 170°C and mixed with 1,920g of trimellitic anhydride. The temperature is now held at 160°C for 30 minutes. Subsequently the resin is drawn off. Characteristics of the product: acid number 200, melting range 65°–75°C.

B2. 2,000g of poly(ethylene terephthalate) and 1440g of dimethylol cyclohexane are heated to 250°C in the presence of 5g of cobalt butyl phthalate. After 2 hours 250g have distilled over. After cooling to 200°C, 1,920g of trimellitic anhydride are added. The reaction mixture is heated to 280°C and this temperature is held for 15 minutes. The resin is then drawn off.

The resin has the following characteristics: acid number 107, melting range 89°–96°C.

B3. 2,000g of poly(ethylene terephthalate) and 1040g of 2,2-dimethyl propane-1,3-diol are heated to 250°C in the presence of 5g of cobalt butyl phthalate. After 2 hours, 250g of distillate have distilled over. After cooling to 200°C, 1,920g of trimellitic anhydride are added. The reaction mixture is brought to 180°C and held at this temperature for 30 minutes. Subsequently the resin is drawn off. The acid number amounts to 208 and the melting range is 86°–94°C.

B4. 2000g of poly(ethylene terephthalate), 1200g of hydrogenated bisphenol and 1,500g of a polymerized ethylene glycol with a molecular weight of about 300 are heated to 250°C in the presence of 5g of cobalt butyl phthalate. After 2 hours 11g of distillate have distilled over. After cooling to 200°C, 1,920g of trimellitic acid are added. After 30 minutes at 180°C the resin is drawn off. Characteristics of the product: acid number 150, melting range 54°–60°C.

B5. 400g of poly(ethylene terephthalate) and 268g of trimethylolpropane are heated to 250°C for 2 hours. In this period 60g of distillate distils over. After cooling to 200°C, 592g of phthalic anhydride are added thereto. The temperature is held at 200°C for ½ hour. Subsequently the resin is drawn off. It has the following characteristics: acid number 160, melting range 69°–78°C.

B6. 400g of poly(ethylene terephthalate) and 268g of 1,2,6-hexanetriol are held at 250°C for 2 hours. After this time 75g of distillate have distilled over. After cooling to 200°C, 592g of phthalic anhydride are added thereto. After 30 minutes at 200°C the resin is drawn off. The characteristics are as follows: acid number 133, melting range 48°–52°C.

B7. 296g of phthalic anhydride are esterified to an acid number of 30 with 150g of ethylene glycol. Subsequently 192g of trimellitic anhydride are added and the mixture is held for 30 minutes at 170°C. After cooling, the resin has the following characteristics: acid number 209, melting point 61°C.

B8. 219g of adipic acid are esterified to an acid number of 20 with 360g of hydrogenated diphenylolpropane and 32g of diethylene glycol. Subsequently 144g of trimellitic anhydride are added. The mixture is held for 30 minutes at 170°C and allowed to cool. Characteristics: acid number 146, melting point 72°C.

B9. 296g of phthalic anhydride are esterified to an acid number of 40 with 240g of hydrogenated diphenylolpropane and 148g of diethylene glycol. Subsequently 192g of trimellitic anhydride are added and the temperature held at 170°C for 30 minutes. A resin is obtained with a melting point of 73°C and an acid number of 167.

B10. 219g of adipic acid are esterified to an acid number of 15 with 360g of hydrogenated diphenylolpropane and 41g of dimethylolpropane. Subsequently 288g of trimellitic anhydride are added and the mixture is held for 30 minutes at 170°C. A resin is obtained with a melting point of 72°C and an acid number of 217.

B11. 600g of a high molecular weight poly(ethylene terephthalate) polyester are degraded. with 228g of 1,2-propanediols for 2 hours at 250°C. Subsequently the reaction mixture is mixed with 666g of bicyclooctene-tricarboxylic anhydride and the reaction mixture is held for 2 hours at 180° to 190°C. A resin with a melting point of 75°C and an acid number of 150 is obtained.

B12. 400g of a high molecular weight poly(ethylene terephthalate) polyester are degraded. with 268g of trimethylolpropane at 250°C for 2 hours. Subsequently 592 g of phthalic anhydride are added and the reaction mixture is held for 15 minutes at 200°C. The resin has a melting point of 75°C and an acid number of 163.

EXAMPLES 1–9 – THERMOSETTING COMPOSITIONS 1. 300g of component (A1) and 300g of component (B1) are homogeneously mixed in a kneader with 300g of titanium dioxide.

2. 400g of component (A2) and 300g of component (B3) are pulverized in a ball mill.

3. 300g of component (A1) are mixed in the melt with 150g of titanium dioxide. Likewise 300g of component (B4) are mixed in the melt with 150 parts of titanium dioxide.

3. 150g of component (A1) are well homogenized in a kneader with 150g of component (B3) in the presence of 150g of titanium dioxide.

5. 100g of component (A4) are homogeneously mixed in a kneader with 100g of component (B7) in the presence of 100g of titanium dioxide.

6. For the preparation of a binder according to the invention, 100g of each of the components (A7) and (B11) are mixed, homogenized and pulverized.

7. Component (A7) is processed with component (B12) as in the previous Example.

8. 100g of component (A1) are homogenized in a kneader with 100g of a component B comprising a reaction product (melting point 80°C) of 1 mol of trihydroxyethylisocyanurate, 3 mol of tetrachlorophthalic acid and 100g of titanium dioxide.

9. 100g of a reaction product of 1 mol trimethylolpropane and 3 mol tetrachlorophthalic anhydride are homogenized in a kneader with 100g of component (A1) in the presence of 100g of titanium dioxide.

The mixtures of Examples 1 to 9, if not already in powder form, are pulverized and are applied electrostatically to metal. The coated metal is then stoved for 15 minutes at 220°C. Smooth coatings are obtained which exhibit a good gloss, good edge protection and good elasticity accompanied by good cross-linking and chemical resistance. Equally good coatings are obtained if the pulverized mixture according to Example 3 is applied by the whirl sintering process. Coatings prepared from the mixture according to Example 8 are characterized by a good chemical resistance.

EXAMPLES 10 to 14

10. 300g of component (A5) are homogenized in a kneader with 300g of component (B10) and 300g of titanium dioxide.

11. 50g of a copolymer of melting point 90°C (component A), formed from 70 parts by weight of methyl methacrylate and 30 parts by weight of 3-hydroxypropylmethacrylate, and 50g of a copolymer (of melting point 100°C, component B), formed from 70 parts by weight of methyl methacrylate and 30 parts by weight of methacrylic acid, are homogenized in an extruder.

12. 50g of component B of the previous Example are homogenized in a kneader with 50g of component (a1) and 50g of titanium dioxide.

13. 50g of component A of Example 11 and 50g of component B4) are homogenized in a kneader with 50g of titanium dioxide.

14. In the same way as in Example 10 all the components (a1) to (A6) can be mixed with components (B7) to (B10). Also various pigments can be mixed in. After stoving for 15 to 20 minutes film coatings of similar good quality are always obtained.

The mixtures of Examples 10–14, if not already in powder form, were pulverized to form powder mixtures.

EXAMPLE 15

A mixture of 100g of component (A1), 100g of component (B1), 500g of asbestos dust and 8g of zinc stearate are processed to a sheet on rolling mill on a temperature of 110°C. A sample taken from this sheet is pressed for 20 minutes at 220°C and a pressure of 200 atm to a moulded article with a diameter of 6 to 8cm and a wall thickness of 2 to 3mm.

What we claim is:

1. A thermosetting resinous composition comprising a low viscosity, pulverulent mixture of (A) a polyester resin containing free hydroxyl groups with a hydroxyl number between 150 and 450 and (B) a polyester resin containing free carboxyl groups, both of said resins having a melting point of at least 50°C, (A) being a polyester resin based on a1) at least one dicarboxylic acid of four to 12 carbon atoms and b1) at least one compound selected from the group consisting of an alcohol of three to 12 carbon atoms being at least trihydric and a mixture of said at least trihydric alcohol with at least one dihydric alcohol of two to 18 carbon atoms and (B) being a polyester resin based on a2) at least 1 polycarboxylic acid of two to 24 carbon atoms and b2) at least one dihydric alcohol of two to 24 carbon atoms.

2. A composition as claimed in claim 1, wherein the pulverulent mixture contains two terephthalic acid polyesters (A) and (B), the polyesters containing residues of at least one polyhydric alcohol having two to 18 carbon atoms.

3. A composition as claimed in claim 1, wherein component (A) has a hydroxyl number of 150 to 450 and is a polyester which is a transesterification product of (a) a high-molecular weight terephthalic acid polyester or (b) a monomeric terephthalic acid ester of a monohydric alcohol having one to four carbon atoms with (c) at least one alcohol selected from the group consisting of at least trihydric alcohols having three to 12 carbon atoms and dihydric alcohols having two to 18 carbon atoms.

4. A composition as claimed in claim 1, wherein the melting points of the components (A) and (B) are at least 65 and not higher than 150°C.

5. A composition as claimed in claim 1 wherein the hydroxyl number of component (A) is higher than the acid number of component (B).

6. A composition as claimed in claim 1, wherein the components (A) and (B) are present in such an amount that the ratio of the free carboxyl groups to the free hydroxyl groups is in the range from 0.75:1 to 1:0.8.

7. A composition as claimed in claim 1, wherein at least one of the components (A) and (B) contains residues of an alcohol selected from the group consisting of dihydric alcohols merely consisting of carbon atoms, hydrogen atoms and hydroxyl groups with eight to 24 carbon atoms and dihydric alcohols with two to 18 carbon atoms containing at least one ether or ester group.

8. A process for forming a moulded article wherein a composition as claimed in claim 1 and containing a filler and other conventional moulding additives is formed into a moulded article.

9. A shaped article whenever coated or formed with a composition obtained by hardening the composition of claim 1.

* * * * *